(12) United States Patent
Kojima et al.

(10) Patent No.: US 6,721,251 B2
(45) Date of Patent: Apr. 13, 2004

(54) RECORDING MEDIUM, SIGNAL RECORDING METHOD AND APPARATUS AND SIGNAL REPRODUCING APPARATUS

(75) Inventors: Tadashi Kojima, Yokohama (JP); Hiroharu Sato, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 379 days.

(21) Appl. No.: 09/953,924

(22) Filed: Sep. 18, 2001

(65) Prior Publication Data

US 2002/0136125 A1 Sep. 26, 2002

(30) Foreign Application Priority Data

Mar. 22, 2001 (JP) .......................... 2001-083332

(51) Int. Cl.[7] .................................. G11B 7/00
(52) U.S. Cl. ................... 369/47.54; 369/53.18; 369/44.32; 369/44.27
(58) Field of Search .............................. 369/47.1, 47.14, 369/47.15, 47.21, 47.22, 47.31, 47.5, 47.54, 53.1, 53.18, 53.13, 53.19, 53.32, 53.42, 59.1, 44.27, 44.28, 44.34, 44.32

(56) References Cited

U.S. PATENT DOCUMENTS 5,822,285 A * 10/1998 Rugar et al. ............. 369/44.26
6,337,839 B1 * 1/2002 Nakane et al. ........... 369/59.25
6,504,800 B1 * 1/2003 Kuwahara et al. ........ 369/47.5

FOREIGN PATENT DOCUMENTS

| JP | 11-96555 | 4/1999 |
| JP | 11-213565 | 8/1999 |

* cited by examiner

Primary Examiner—Muhammad Edun
(74) Attorney, Agent, or Firm—Oblon, Spivak, McClelland, Maier & Neustadt, P.C.

(57) ABSTRACT

As pit patterns a pattern A and a pattern B are prepared. The adjacent tracks are made to have different embossed pit patterns.

12 Claims, 13 Drawing Sheets

| Header field 1 | | | | | Header field 2 | | | | |
|---|---|---|---|---|---|---|---|---|---|
| VFO1 | AMa | PID1 | IED1 | PA1 | VFO2 | AMa | PID2 | IED2 | PA2 |
| 36 | 3 | 4 | 2 | 1 | 8 | 3 | 4 | 2 | 1 |

| Header field 3 | | | | | Header field 4 | | | | |
|---|---|---|---|---|---|---|---|---|---|
| VFO3 | AMa | PID3 | IED3 | PA3 | VFO4 | AMa | PID4 | IED4 | PA4 |
| 36 | 3 | 4 | 2 | 1 | 8 | 3 | 4 | 2 | 1 |

| Header field 1 | | | | | Header field 2 | | | | |
|---|---|---|---|---|---|---|---|---|---|
| VFO1 | AMb | PID1 | IED1 | PA1 | VFO2 | AMb | PID2 | IED2 | PA2 |
| 36 | 3 | 4 | 2 | 1 | 8 | 3 | 4 | 2 | 1 |

| Header field 3 | | | | | Header field 4 | | | | |
|---|---|---|---|---|---|---|---|---|---|
| VFO3 | AMb | PID3 | IED3 | PA3 | VFO4 | AMb | PID4 | IED4 | PA4 |
| 36 | 3 | 4 | 2 | 1 | 8 | 3 | 4 | 2 | 1 |

| Header field 1 | | | | | Header field 2 | | | | | Header field 3 | | | | |
|---|---|---|---|---|---|---|---|---|---|---|---|---|---|---|
| VFO1 | AM | PID1 | IED1 | PA1 | VFO2 | AM | PID2 | IED2 | PA2 | VFO3 | AM | PID3 | IED3 | PA3 |
| 36 | 3 | 4 | 2 | 1 | 8 | 3 | 4 | 2 | 1 | 8 | 3 | 4 | 2 | 1 |

| Header field 1 | | | | | Header field 2 | | | | | Header field 3 | | | | |
|---|---|---|---|---|---|---|---|---|---|---|---|---|---|---|
| VFO1 | am | PID1 | IED1 | PA1 | VFO2 | am | PID2 | IED2 | PA2 | VFO3 | am | PID3 | IED3 | PA3 |
| 36 | 3 | 4 | 2 | 1 | 8 | 3 | 4 | 2 | 1 | 8 | 3 | 4 | 2 | 1 |

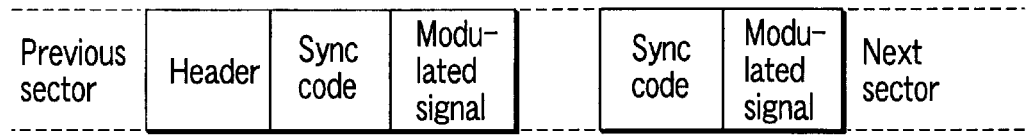
FIG. 16
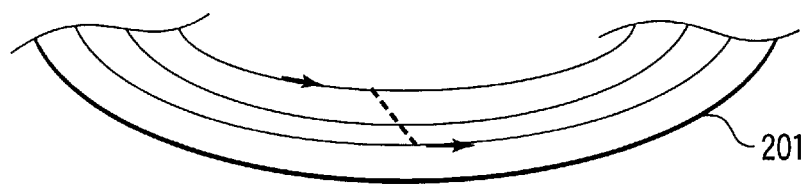
FIG. 17A
| | Sector | PI |
|---|---|---|
| | Sector | PI |
| Sector | → | PI → |
| | Sector | PI |
| | | PI |
| | Sector | PI |
ECC block
FIG. 17B

RECORDING MEDIUM, SIGNAL RECORDING METHOD AND APPARATUS AND SIGNAL REPRODUCING APPARATUS

CROSS-REFERENCE TO RELATED APPLICATIONS

This application is based upon and claims the benefit of priority from the prior Japanese Patent Application No. 2001-083332, filed Mar. 22, 2001, the entire contents of which are incorporated herein by reference.

BACKGROUND OF THE INVENTION

1. Field of the Invention

The present invention relates to a recording medium, signal recording method and apparatus and signal reproducing apparatus in which information is recorded and reproduced in a predetermined track form.

Recording tracks on recording media are formed with physical addresses in units of a predetermined recording capacity. The physical addresses take the form of embossed pits or other marks. The recording/reproducing method and apparatus have the recording error preventing capability. The same applies to recording media with multiple levels of recording layers and the recording method and apparatus therefor.

2. Description of the Related Art

With optical disks adapted for recording and reproduction, wobbled tracks are formed in the form of spirals and signals are recorded in track grooves or on lands between track grooves. Optical disks in which signals are recorded in grooves include CD-R disks, CD-RW disks, DVD-R disks, and DVD-RW disks. Optical disks adapted to record signals in grooves and on lands include DVD-RAM disks, in which signal recording is achieved by forming marks corresponding to signals on tracks using a laser beam.

Those recording media have wobbling tracks. Physical position signals on tracks are adapted to modulate a signal associated with wobbling (wobbling signal) as a carrier and the resulting modulated signals are recorded. Recording media of this type include CD-R disks, CD-RW disks, etc. In the DVD-RAM disks, the recording areas are formed in units of a predetermined recording capacity and physical address information is recorded in the form of embossed pits between each recording area. At the time of signal recording, each time the physical address information is detected, an information signal is recorded in the desired area.

The optical disk recording/reproducing system is divided into the CD system to adopt a laser beam of 780 nm in wavelength and the DVD system to adopt a laser beam of 650 nm. In recent years, working is proceeding with the next-generation of optical disks using a violet laser beam of 450 nm, which is intended to increase the recording density and recording capacity by making smaller marks with smaller beams.

As another technique to increase the recording capacity of recording/reproducing DVDs, the multi-layered structure is expected as used in DVD-ROM disks.

Recordable DVD types of optical disks include DVD-RAM disks, DVD-R disks, and DVD-RW disks, which are 12 cm in diameter and has a recording capacity of 4.7 gigabytes on each side. The DVD-ROM disks have each side double-layered as described above and have a capacity of 9 gigabytes on each side. Two-layered recording media have been implemented on the working level and are therefore expected to be mass-produced in the near future.

With such two-layered disks, in order to identify the layer which is being written on or read from, it is required to embed layer identification information in advance. For example, in the case of DVD, in a part of ID information for each sector is embedded layer number data as sector information. Reading the sector information allows the current layer to be identified.

However, the reading of the sector information needs a procedure of reading a block consisting of multiple sectors in sector synchronized state and then subjecting the block to error detection and correction. Only when the block is error free is the sector information identified.

Such a procedure is inconvenient in the event that recording has to be stopped quickly because of the occurrence of an interlayer jump during recording. This is due to the fact that the early layer identification is impossible with the above procedure.

In contrast, the occurrence of an intertrack or interlayer jump due to defects or vibrations during reproduction is not a serious problem. This is because, in the event that information subjected to error correction and then recovered as highly reliable data is determined through PID not to be target information, it is only required to discard that information and reperform the read operation. With reproduction, therefore, no problem arises except that the read time may be increased.

However, the occurrence of an interlayer jump during recording results in destruction of correct data already recorded, which becomes a serious problem. Destroying a large block of data, for example, a large quantity of data beyond the error correcting capability, by an interlayer jump resulting from malfunctions results in the inability to recover the data. That is, in the event of an interlayer jump, it is desirable to stop the recording operation as early as possible, i.e., before the error correcting capability is exceeded.

The aforementioned problem with respect to the interlayer jump also arises with an intertrack jump from one track to the adjacent one. It should be noted that the track pitch has progressively decreased with increasing recording density.

To perform tracking control using a read head, its object lens is controlled, but the mass of the object lens remains substantially the same as before. It has therefore become very difficult to prevent a jump to a separate track resulting from vibrations or defects, such as flaws, because the track spacing has become reduced.

On the occurrence of a track jump during recording, failure to record data on the correct track occurs, which can be solved by recording that data again. However, data already recorded are destroyed by new data and the recovery thereof becomes difficult.

As described above, in recording onto recording/reproducing media, it is required to achieve the detection of physical recording locations and the prevention of a jump to a separate track.

The detection of the recording initiation location can be achieved by multiple-detection of the constituents of the physical structure of optical disks. However, it is difficult to prevent the occurrence of a jump to a separate track resulting from defects or vibrations during recording. Consequently, it becomes important to minimize damage by detecting the jump and then stop the recording operation. In general, a track jump (including an interlayer jump) is accompanied by a tracking error signal large in magnitude, which, depending on the contents of defects, may not be detected. It is therefore important to, after the occurrence of a jump, detect recording being made on a track different from an intended track through the use of a separate signal. As apparatus for preventing wrong recording, a technique is disclosed in Jpn. Pat. Appln. KOKAI Publication No. 11-213565; however, this is intended to prevent wrong recording between disks.

BRIEF SUMMARY OF THE INVENTION

According to embodiments of the present invention to provide a recording medium, a signal recording method and apparatus, and a signal reproducing apparatus which, at the occurrence of a jump from a track in the process of being recorded to a separate track on a recording/reproducing media, permit the fact to be detected quickly through the use of physical marks, such as embossed pits, that form addresses of recording tracks on the media.

To achieve the above objects, a recording medium in which each recording track is divided into recording areas each of a predetermined recording capacity and, in each of the recording areas, its physical address is formed of embossed pits (or information containing the physical address is formed of marks, or the physical address is formed of marks, characterized in that embossed pit patterns (or the shape of the marks) are made different between adjacent tracks (or between adjacent layers).

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently embodiments of the invention, and together with the general description given above and the detailed description of the embodiments given below, serve to explain the principles of the invention.

FIG. 16 shows the arrangement of information recorded on a DVD-RAM disk;

FIGS. 17A and 17B are diagrams for use in explanation of the occurrence of a track jump on a disk in record mode and the state of an ECC block recorded on the disk to which the jump has been made.

DETAILED DESCRIPTION OF THE INVENTION

With recording/reproducing optical disks, track grooves are formed to spiral outwards from the disk center. Information signals are written on the disks by forming recording marks in the grooves with a laser beam.

To form marks, this method involves changing the reflectance/absorptance of a photosensitive organic substance as a recording medium through heat generated by the laser beam or causing a recording medium to make phase changes (crystallization and noncrystallization) through fuse liquefaction.

Representative optical disks now commercially available include CD-R disks, CD-RW disks, DVD-R disks, DVD-RW disks, and DVD-RAM disks. These optical disks have track grooves generally formed to wobble in order to make the recording density constant. At the time of recording, a wobble signal is sensed to operate a wobble signal-locked PLL circuit and the output of the PLL circuit is then frequency-multiplied to produce a write clock.

At the time of initialization of CD-R and CD-RW disks, the wobble signal, used as a carrier signal, is modulated with position information (address signal) through biphase modulation scheme and physical addresses (ID) are recorded by a laser beam corresponding to the modulated carrier signal.

At the normal signal recording/reproducing time, position information can be recovered from the modulated wobble signal by an ID demodulation circuit. However, the demodulation of the position information needs detecting of the wobble signal over a specific length of time, requiring scanning the track over a fixed distance.

Figure 1:
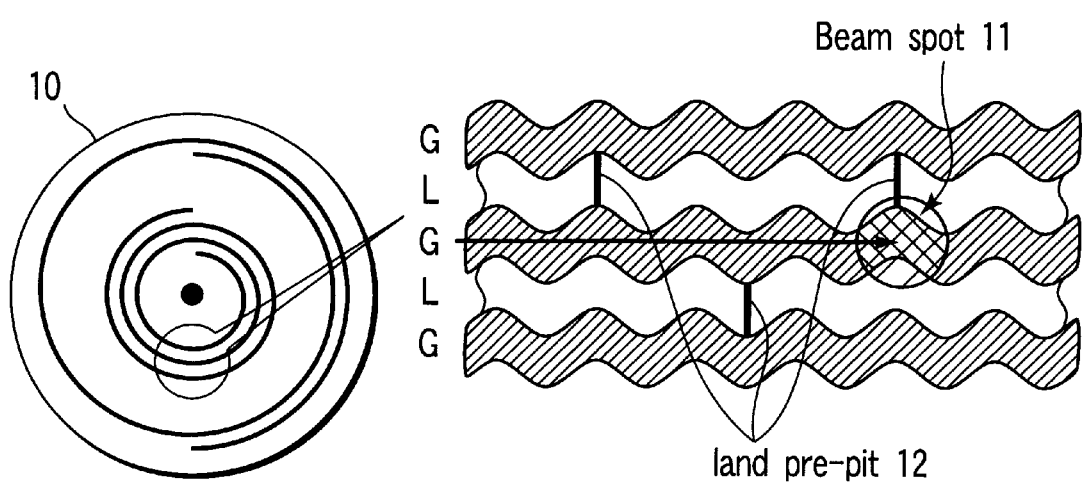
FIG. 1 is a diagram for use in explanation of pre-pit locations on a DVD-R disk.

FIG. 1 illustrates the relationship between the track arrangement and the wobble signal in DVD-R disks. Track grooves are formed to spiral outwards from the center of a disk 10. The grooves G are wobbled as shown enlarged. With DVD-R and DVD-RW disks, physical identification data (PID) as position information is set up by placing marks, called land pre-pits, on land tracks between the grooves. The arrangement relationship of the pre-pits spaced at a fixed distance apart from one another indicates ID information. In FIG. 1, there are illustrated pre-pits 12 placed at regular intervals.

A pick-up is controlled for tracking of a laser beam so that a beam spot 11 is maintained accurately on the groove track G.

Figure 2:
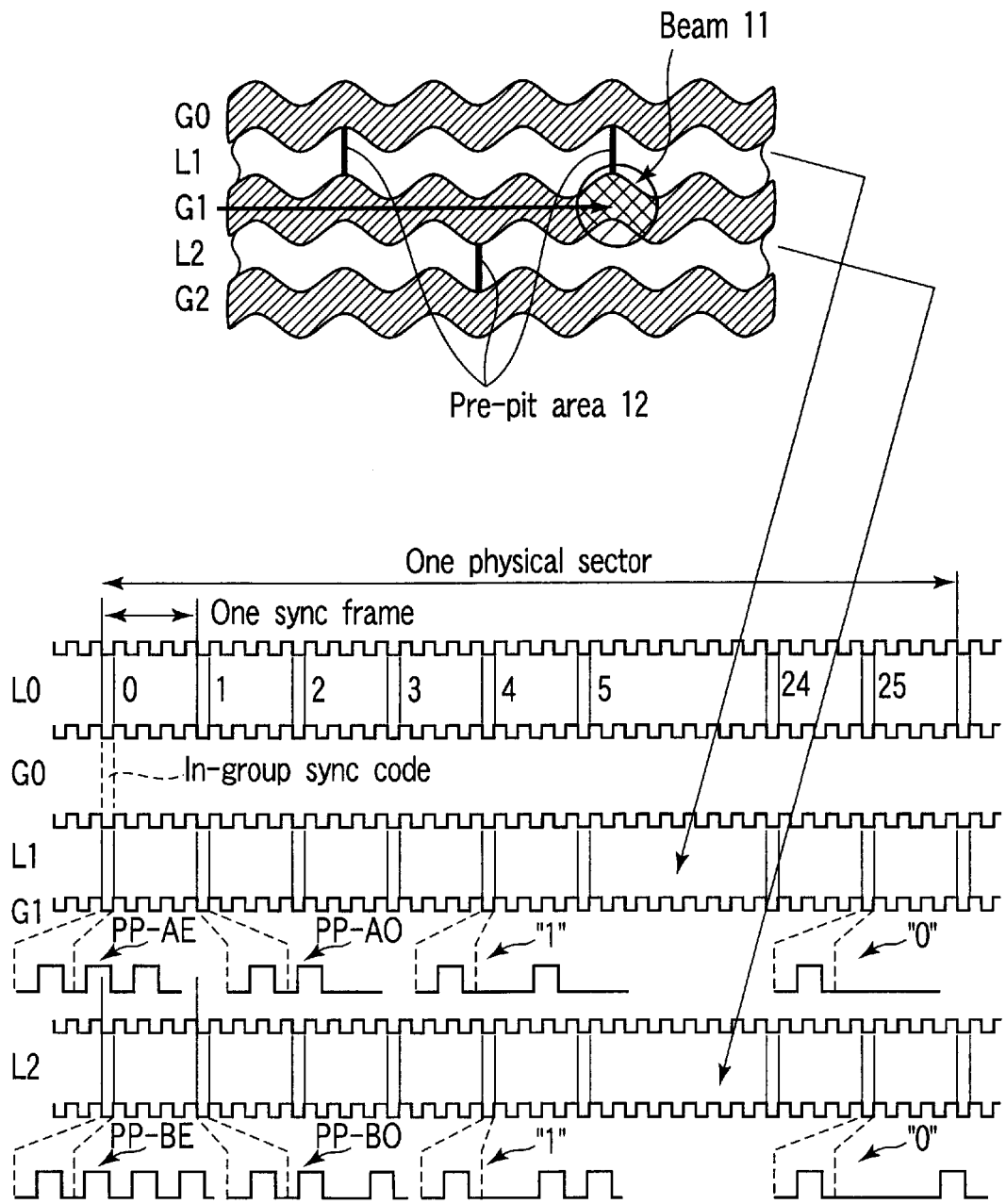
FIG. 2 is a diagram for use in explanation of a relation between pre-bit locations and tracks in accordance with an embodiment of the present invention.

FIG. 2 shows the arrangement of positions on DVD-R land tracks where PID is to be embedded. According to DVD standards, one physical sector is made up of 26 frames and one frame is composed of a sync signal of two bytes long, information data, and a parity signal of 82 bytes.

The pre-pits constituting PID are provided to conform to the sync position at the beginning of each frame. In the presence of a separate pre-bit in the same angular position as a land pre-pit on the adjacent land track, crosstalk becomes a problem. This problem is resolved by using either of even-numbered frames and odd-numbered frames for PID land pre-pits. As a result, one physical sector can accommodate 13 bits of PID information. The PID information consists of one bit of sync information, four bits of in-ECC (error checking and correction)-block sector relative address, and eight bits of ECC address. One bit of data is represented by three pits (bits). Thus, the entire PID information is stored over two or more physical sectors.

FIG. 2 shows the PID embedding position. This figure indicates that either even position or odd position is selected.

In the event of a track jump during recording, the ECC address cannot be detected before the entire ECC block moves past the pick-up and whether the sector relative addresses are abnormal or not is not be detected. One ECC block corresponds to 16 physical sectors. Thus, with the method to judge whether a track jump has occurred by detecting the abnormal ECC address, information that has been written in the location to which the jump is made will continue to be destroyed until one ECC block is recorded in its entirety.

FIG. 2 shows sync frames 0 through 25 contained in one physical sector on a land track. The position in which a land pre-pit is provided is reserved at the beginning of each sync frame. Sixteen physical sectors correspond to one ECC block of information recorded on each groove track. In the land pre-pit area corresponding to the start of one ECC block is written a pre-pit sync code PP-AE that represents an even frame. In the next pre-pit area is written a pre-pit sync code PP-AO indicating an odd frame. In the subsequent pre-pit areas are described the in-ECC-block sector relative address (four bits), the ECC block address, the field address, disk information, and parity information.

Normally, the even position is used as the pre-pit area. When pre-pit areas are adjacent to each other on adjacent lands, the odd position is used on either land.

In the present invention, pre-pits are recorded in different patterns on adjacent lands. In FIG. 2, there are illustrated three lands L0, L1 and L2. On the land L1 a pre-pit pattern A is adopted. On the adjacent land L2 a pre-bit pattern B is adopted. In the pattern A, the even position is represented by a sync code PP-AE (pit pattern "1, 1, 0, 0") and the odd position is represented by a sync code PP-AO (pit pattern "1, 1, 1, 0").

In the pre-pit information on the land L1, data "1" is represented by the pit pattern "1, 0, 1, 0" and data "0" is represented by the pit pattern "1, 0, 0, 0".

In contrast, the pre-bit pattern B is adopted on the adjacent land L2, in which the even position is represented by a sync code PP-BE (pit pattern "1, 1, 1, 1") and the odd position is represented by a sync code PP-BO (pit pattern "1, 1, 0, 1").

In the pre-pit information on the land L2, data "1" is represented by the pit pattern "1, 0, 1, 1", and data "0" is represented by the pit pattern "1, 0, 0, 1".

Figure 3:
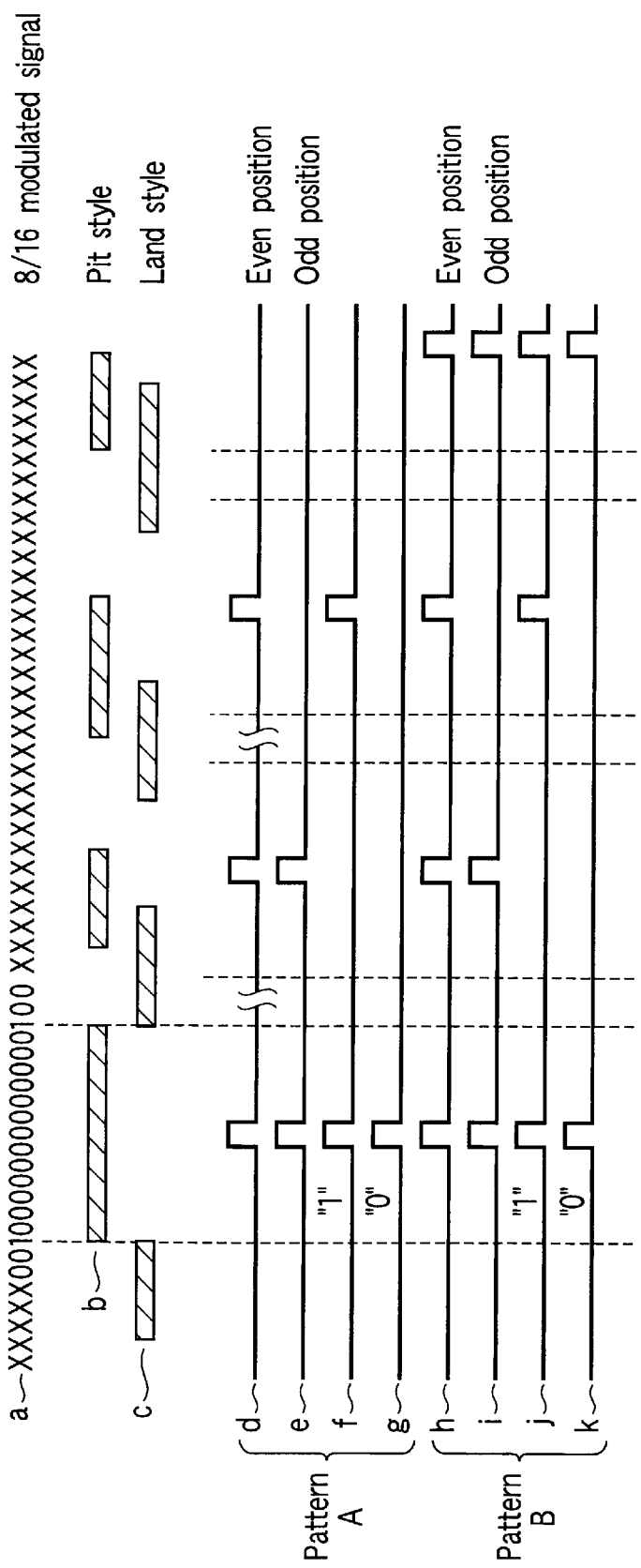
FIG. 3 is a diagram for use in explanation of a pre-pit pattern according to an embodiment of the present invention.

FIG. 3 shows a relationship between land pre-pits and a record signal.

In FIG. 3, a indicates a string of bits of data in a record signal recorded on a groove and "100 . . . 01" indicates a sync code. b indicates an example in which the pre-bit sync code is a pit style. c indicates an example in which the pre-bit sync code is a land style. The start bit of the pre-pit sync code is made to correspond in position to the sync code of the record signal recorded on the groove.

In FIG. 3, d indicates an example of a pre-pit sync code described at the start of an even sync frame shown in FIG. 2, e indicates an example of a pre-pit sync code described at the start of an odd sync frame, f indicates pre-pit data when data to be described in the pre-pit area is a 1, and g indicates pre-pit data when data to be described in the pre-pit area is a 0.

The d, e, f and g signals correspond to the aforementioned pre-bit pattern A. In FIG. 3, h indicates an example of a pre-pit sync code described at the start of an even sync frame shown in FIG. 2, i indicates an example of a pre-pit sync code described at the start of an odd sync frame, j indicates pre-pit data when data to be described in the pre-pit area is a 1, and k indicates pre-pit data when data to be described in the pre-pit area is a 0. The h, i, j and k signals correspond to the aforementioned pre-bit pattern B.

With the pre-pit pattern arranged as described above, the occurrence of a jump to the adjacent track can be detected immediately by simply providing a function of discriminating the sync codes in the pre-pit patterns A and B. Even if the sync code pattern is changed to a different pattern, no problem may arise. This is the case where scanning has advanced to the first track and then proceeds to the next land. This situation should be prevented from being considered as a track jump. To this end, the previously read ECC address is simply recognized as the last address on the first track.

Further, when different pre-bit patterns continue over two or more frames at the time of recording, it may be decided that a track jump has occurred. In such an event, operations are performed for stopping the recording operation, reading recorded data at the location to which a jump has been made, making error corrections, restoring the destroyed data portion, and rewriting the resultant data. Thereby, data destruction due to a track jump can be minimized.

As described above, at the occurrence of a track jump, monitoring pre-pit patterns allows abnormal recording to be detected at an early stage. However, at the occurrence of an interlayer jump in multilayered disks as well, the present invention allows abnormal recording to be detected at an early stage.

The present invention is not limited to the above embodiment.

Although the above embodiment has been described in terms of DVD-R disks, the principles of the invention is equally applicable to DVD-RW disks.

Furthermore, the present invention is also applicable to DVD-RAM disks.

Figures 4, 5A, 5B:
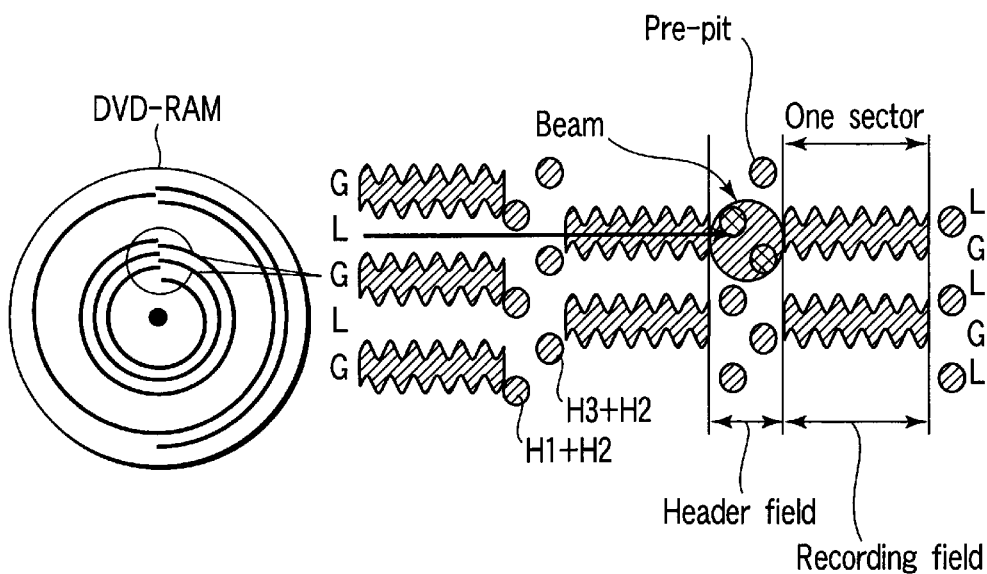
FIG. 4 is a diagram for use in explanation of pre-pit locations on a DVD-RAM disk.
FIGS. 5A and 5B are diagrams for use in explanation of header field (containing embossed pre-pits) patterns according to a second embodiment of the present invention.

FIG. 4 shows the locations of PID pre-pits in DVD-RAM disks in which recordings are made on lands L and grooves G. In DVD-RAM, PID-containing header field areas H1, H2, H3 and H4 are provided between recording physical sectors. These header fied arears provided on the borde line between land L and groove G. This header system is called CAPA (Complementally Allocated Pit Address) system.

According to such an arrangement structure, a block composed of header fields H1 and H2 and a block composed of header fields H3 and H4 can be employed for lands and grooves, allowing the PID area to be made small.

FIG. 5A shows the data arrangement of header fields FA1 and FA2 and header fields FA3 and FA4 in the pattern A.

FIG. 5B shows the data arrangement of header fields FB1 and FB2 and header fields FB3 and FB4 in the pattern B. The figure described below each item in each field represents the number of bytes.

To record data in an addressed sector on an unrecorded DVD, it is required to generate a read clock. To this end, read clock generation information VFO (variable frequency oscillator) and AM (address mark) information indicating the start point of PID information are appended to the PID information. This arrangement provides high utilization because one header field is used for land and groove areas. In addition, to increase the reliability of read position information, four sets of header information are read in. In particular, the header of CAPA system is off the beam center, and there is the possibility that read signals are accompanied by distortion. In this case, there is also a possibility of failure to decide whether that PID information has been read or not.

In this disk, the header fields FA1, FA2, FA3 and FA4 in the pattern A and the header fields FB1, FB2, FB3 and FB4 in the pattern B differ in the address mark AM pattern. The address mark is an embossed pattern, indicating data that follows is PDI. In the present invention, two address mark patterns are used.

Thus, a decision can be made readily as to whether a track jump or interlayer jump has occurred by monitoring of the address marks.

The present invention is not limited to the above embodiment.

Figures 6, 7A, 7B:
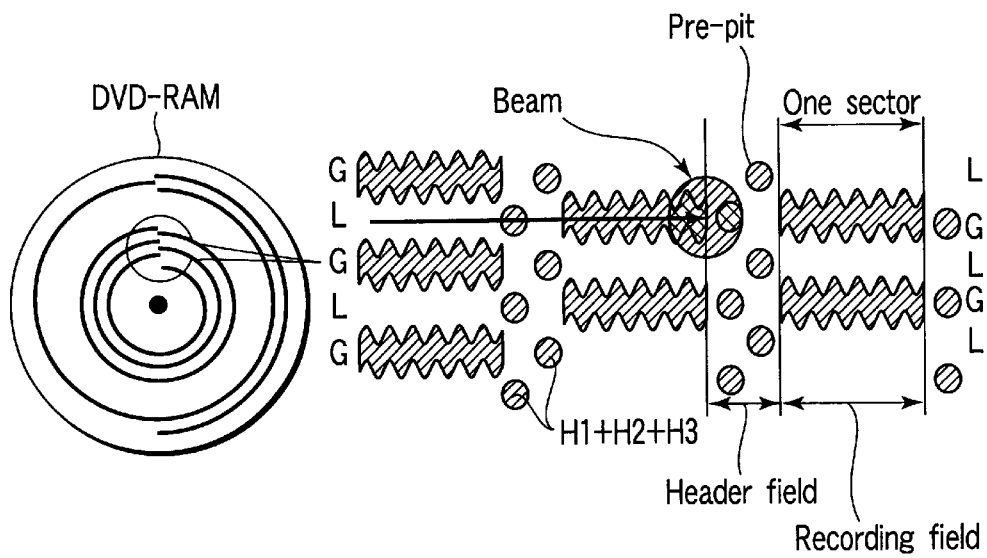
FIG. 6 is a diagram for use in explanation of pre-pit locations on another DVD-RAM disk.
FIGS. 7A and 7B are diagrams for use in explanation of header field (containing embossed pre-pits) patterns according to a third embodiment of the present invention.

FIG. 6 shows an arrangement in which pre-pits are each placed at the center of the corresponding track. In this example, three header fields are arranged in a line, which allows the distortion of read pre-pit signals to be reduced.

FIGS. 7A and 7B show data formats of the respective header fields. In this DVD-RAM, the header fields HFA1, HFA2 and HFA3 in the pattern A and the header fields HFB1, HFB2 and HFB3 in the pattern B are prepared. In this case as well, the patterns A and B differ in the address mark AM pattern.

Thereby, a decision can be made readily as to whether a track jump or interlayer jump has occurred by monitoring of the address marks.

Thus, by embedding in PID information signals that allow the occurrence of a jump to a separate track to be detected readily, the system of the present invention can stop recording immediately upon detecting of a separate track and, in the event of destruction of data already recorded, read destroyed data, make corrections on it, and rewrite data. In this manner, destroyed data can be recovered.

Figure 8:
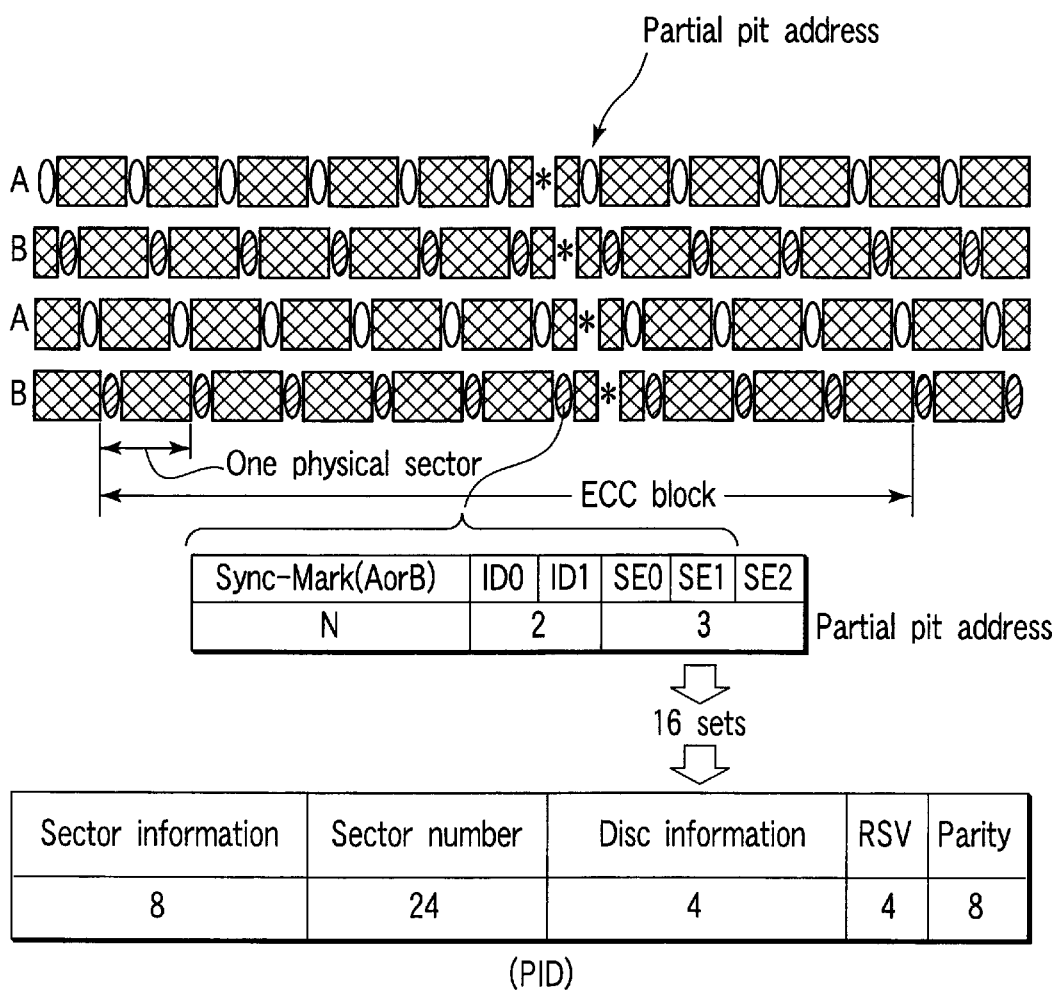
FIG. 8 is a diagram for use in explanation of sync mark patterns according to a fifth embodiment of the present invention.

FIG. 8 shows still another embodiment. In FIG. 8, A denotes a track having pre-pit information corresponding to the pattern A, and B denotes a track having pre-pit information corresponding to the pattern B.

Basically, the PID information reading clock is generated by wobbling tracks. The PID information is arranged with the wobbling period and the PID pattern used is a simple one. In this case, a sync mark is appended to the PID information and two or more sync marks are prepared so that they are changed at intervals of the track period, thereby detecting the occurrence of a jump to the adjacent track.

The embodiment of FIG. 8 uses three bits of data SE0, SE1 and SE2 in each physical sector when one ECC block is made up of 16 sectors. That is, a collection of 16 sectors results in 3 bits×16=48 bits. The 48 bits are used to constitute the physical address (sector number) of the ECC block, sector information, disk information, reserve (RSV), and parity.

IDO1 and IDO2 represent the ascending number in four-sector rotation and are used to confirm the progressiveness of sectors. In this case, two or more patterns of ID0 and ID1 are prepared so that they vary between tracks and two or more sync patterns are prepared for detecting a track jump in error. The ID0 and ID1 are not indispensable. The object of the present invention is to, in the event that a jump has been made to the adjacent track in error, detect the situation quickly and, if a recording operation is in progress, stop the recording, by preparing two or more sets of ingredient signals for PID information and making them vary between adjacent tracks.

Figure 9:
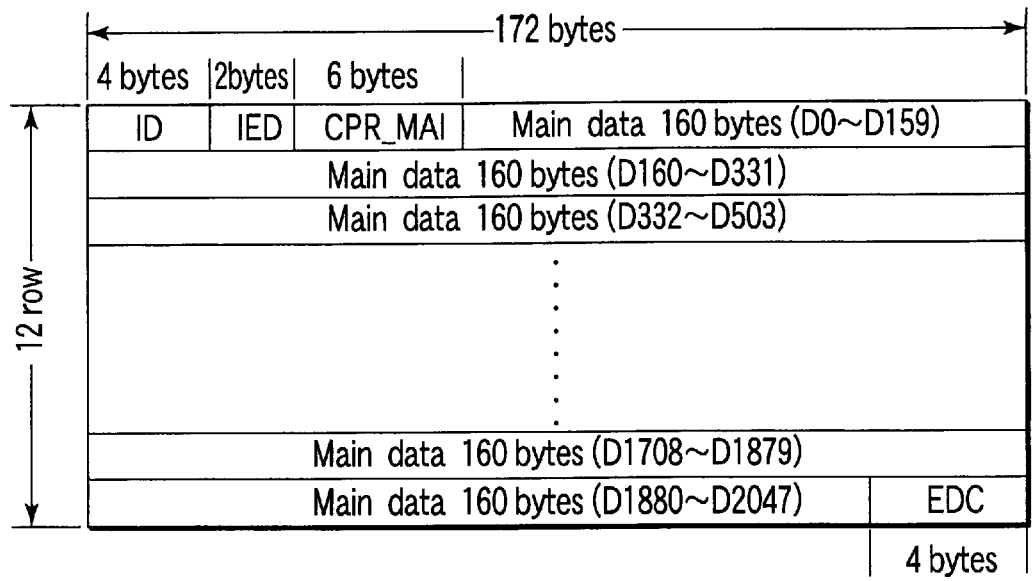
FIG. 9 shows the format of a sector block in DVD.
Figure 10:
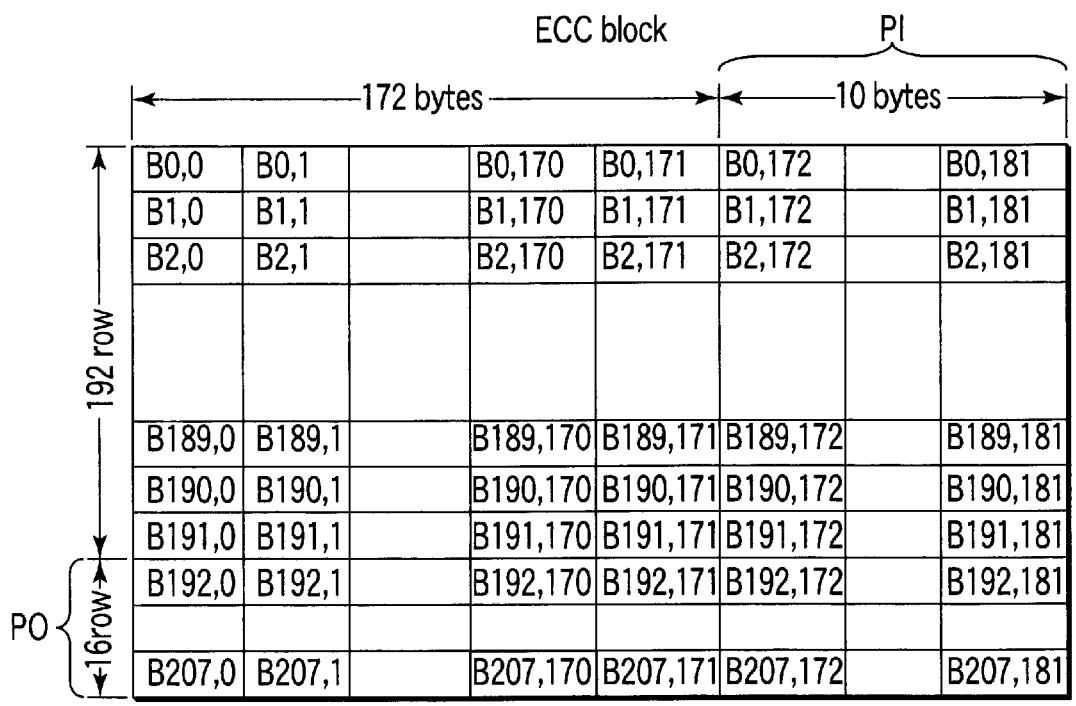
FIG. 10 shows the format of an ECC block to which error correcting codes are appended.
Figure 11:
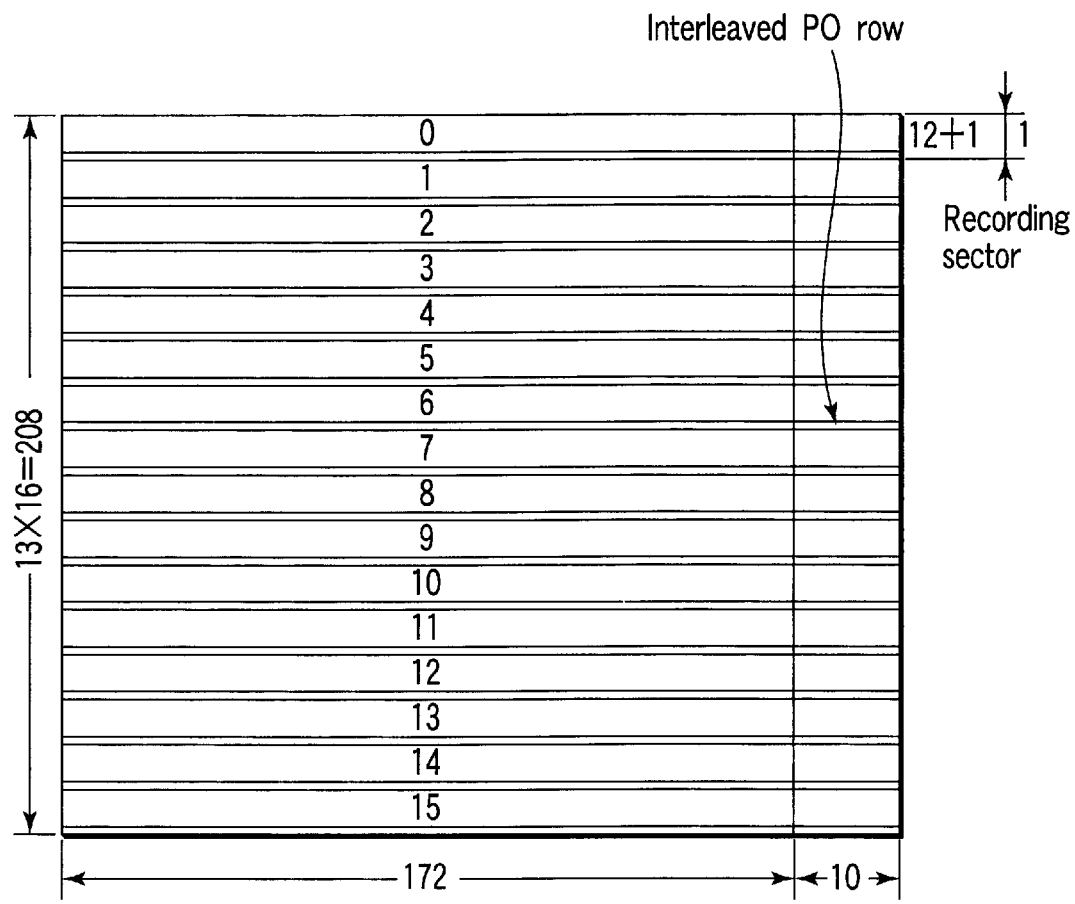
FIG. 11 shows the format of a PO parity-interleaved ECC block.

FIGS. 9, 10 and 11 illustrate the sector format, the ECC block format, and the last recorded ECC block format which conform to DVD standards.

In FIG. 9, the data sector consists of 2064 bytes containing 2048 bytes of main data, i.e., 172 bytes×12 rows. That is, the data sector contains 2048 bytes of main data, 4 bytes of identification data (ID), 2 bytes of ID error correcting code (IED), 6 bytes of copy right management information (CPR_MAI), and 4 bytes of error correcting code (EDC).

The format of the ECC block will be described with reference to FIG. 10.

The data block is arranged in the form of 172 columns× 192 rows consisting of a collection of 16 data sectors each of 172 bytes×12 rows. Error correcting codes are appended to the 172 columns×192 rows. An error correcting code PO of 16 bytes is appended to each of 172 columns. Each column including PO is made up of 192+16 bytes, i.e., 208 bytes. An error correcting code PI of 10 bytes is appended to each of a total of 208 rows including 16 rows of error correcting codes PO. Each row including PI is composed of 172+10 bytes, i.e., 182 bytes. That is, one ECC block having error correcting codes PI and PO appended is formed into the array of 182 columns×208 rows.

In the ECC block consisting of 208 rows×182 rows, 16 rows of error correcting code PO are distributed byte by byte base, and inserted to every 12 rows one at a time, resulting in a rearranged (row interleaved) format as shown in FIG. 11. Therefore, the ECC block after being row-interleaved is made up of 16 sections each of 182 bytes×13 rows (=12 rows of data plus one row of PO).

One recording sector refers to a sector that is composed of 182 bytes×13 rows (=12 rows of data plus one row of PO) as shown in FIG. 10 and the row-interleaved ECC block is made up of 13 recording sectors as shown in FIG. 11.

A physical sector is created by modulating each of 0-th to 12-th rows of a recording sector of 13 rows×182 bytes (2365 bytes) in sequence while appending a sync code to the beginning of each of first and second halves (91 bytes) of each row. A sync code plus 91-byte data is referred to as a sync frame. The physical sector is therefore composed of 13 rows by 2 sync frames.

In the ECC block, since the PO parity information in row (vertical) direction comprises 16 bytes, the use of correction for loss of data allows burst error correction through 16 rows. This means that, since one sector is (12+1) rows, burst error correction is possible up to 1.3 sectors. Even in the event of erroneous recording (overwriting) due to a track jump or interlayer jump, if the recording is stopped within one sector, data lost by being overwritten can be recovered.

Accordingly, the reliability for recovering can be increased significantly by putting identification signals (IDS) as shown in FIG. 9 to the heads of sectors.

In the event of successive errors, however, there is no guarantee that data in other locations are not in error. Errors are considered to exist in other locations. It is therefore required to take care that successive errors do not occur over 0.5 sectors or more. In view of the burst error correcting capability, it is desirable to set the range of error detection with a margin.

Although the prevention of wrong recording (the recovery of destroyed data) at the time of a jump to the next track has been described so far, an interlayer jump may occur in two-layered recording media. In this case as well, by making some signals vary from layer to layer and, in the event that recorded data on a separate layer are destroyed in error, allowing destroyed data to be restored, the system reliability can be increased.

For example, during recording on an optical disk having two recording layers, a jump may occur from one layer to the other owing to vibrations. With two-layered optical disks, the interlayer distance varies according to the laser wavelength used and the optical properties of the disk material; 40–60 $\mu$m for 650-nm laser and 10–20 $\mu$m for 400-nm laser. Thus, the presence of a slight defect causes the focus error signal to become disturbed and, when accompanied by vibrations, a jump occurs from one layer to the other. If the focus error signal has become disturbed, it becomes impossible to detect the interlayer jump with the focus error signal. After the jump, the recording track to which the jump has been made continues to be recorded. If that track is an unrecorded one, the jump is not a serious problem; otherwise, correctly recorded data will be destroyed. To solve this problem, it is required to detect that the track is not the proper position at an early stage as described previously.

Figure 12:
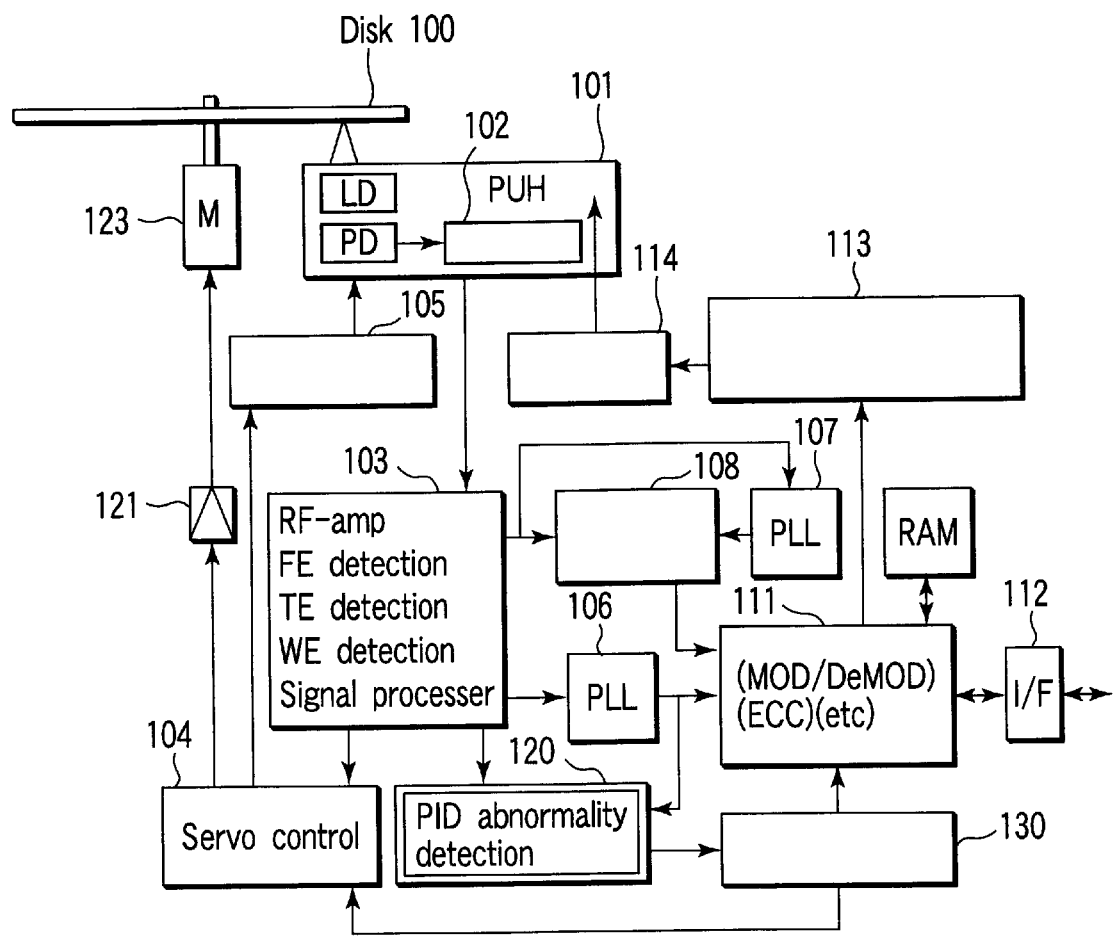
FIG. 12 is a block diagram of a recording/reproducing apparatus of the present invention.

FIG. 12 is a schematic illustration of recording/reproducing apparatus of the present invention. Light emitted from an optical pickup 101 is directed onto a disk 100. Reflected light from the disk is converted into an electrical signal in a head amplifier 102. The electrical signal is input to a signal processing unit 103 which includes an RF amplifier, a focus error (FE) detecting unit (servo error detecting unit), a tracking error (TE) detecting unit, a wobble (WB) signal detecting unit, etc.

A focus error signal (servo error signal) and a tracking error signal are fed into a servo controller 104 where each of them is subjected to optimum equalization. The servo error signal controls the objective lens of the optical pickup and the pickup feed motor through an actuator driver 105. Thus, the laser beam is directed correctly onto a target track. A motor 123 is rotated at a given speed by a motor driver 122.

During the above operation, the wobble signal is also sensed, so that a write clock is generated in a write channel PLL circuit 106. At read time, the clock generated by the PLL circuit 106 may be used to make fast the locking operation of a read clock generated by a read channel PLL circuit 107. The clock from the PLL circuit 107 is applied to a read buffer 108.

At the time of writing of data, a data processing unit 111 appends error detecting codes (EDC) and ID to a data signal coming via an interface 112, performs data scramble processing for servo stabilization on it, appends error correcting codes (ECC) and sync signals to it, and then modulates other than the sync signals. The resultant signal is then sent to a write power controller 113, which writes the signal onto the medium through a laser diode driver 114 according to strategy best suited for the medium.

At read time, an RF signal from the head amplifier 102 is sent through the optimum equalizer to the read buffer 108 and the PLL circuit. Channel data is read into the read buffer 108 by the read clock generated by the PLL circuit 107. The read data is then sent to the data processing unit 111 where synchronized symbol data are read and then error correction and descramble processing is performed. The resultant signal is transferred through the interface 112 to the outside.

Consider here a situation where, at read/write time, particularly at write time, an interlayer jump (or a track jump) has occurred owing to a defect or vibrations. The situation is not serious if the phenomenon can be detected through the tracking error signal or focus error signal. However, when, even if the phenomenon can be detected, it is difficult to confirm that a jump has been made to a separate track, it is not known how to cope with the subsequent writing operation.

To solve this problem, a PID abnormality detecting circuit 120 is provided. A plurality of sets of PID ingredient signals are prepared which are made to vary from layer to layer or from track to track (in general, most of the erroneous track jumps that cannot be detected by the servo error signal are one-track jumps). The abnormality of the detected signals thereof can be detected easily. It is possible to detect quickly that a jump has been made to a separate track. A system controller 130, adapted to control each block in the entire apparatus, is stored with processing programs used at the occurrence of PID abnormality.

In this manner, when abnormality is detected at write time, writing can be stopped quickly and destruction of data already recorded can be minimized. The erroneously destroyed data can be restored by reading the associated block, then subjecting it to error correction and rewriting the resultant data.

The unique functions and operation of the inventive apparatus will be described.

First, the recorded signal structure for information recorded on an optical disk (information recording medium) and the method of creating the recorded signal structure. The contents of information to be recorded on the recording medium is referred to as "information". A connection of "1" and "0" signals in the scrambled or modulated form is referred to as a "signal".

[Recording Unit of Information to be Recorded on Storage Medium]

With the FAT (File Allocation Table) which is generally adopted as a file system for information storage media such as HDD, MO, etc., information is recorded on an information storage medium in units of 256 bytes. In contrast, with the UDF (Universal Disk Format) as a file system for information storage media such as CD-ROM, CVD-ROM, DVD-RAM, etc., information is recorded in units of 2048 bytes. The smallest unit (256 or 2048 bytes) is called a sector.

Figure 13:
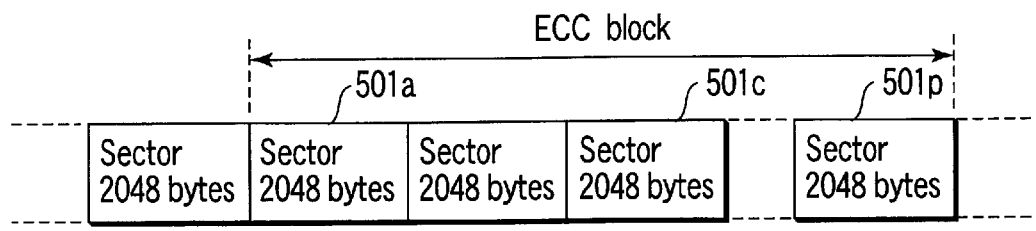
FIG. 13 shows an arrangement of sectors recorded on an optical disk.

As shown in FIG. 13, with UDF-based storage medium, 2048 bytes of information are recorded in each sector. The CD-ROM and DVD-ROM disks are handled as naked disks with no cartridge. On the user side, therefore, the surface of the storage medium is apt to get scratches or dust, which may make it impossible for a specific sector (for example, sector 501c in FIG. 12) to be read from or written onto. For this reason, an error correcting scheme has been adopted which allows for such a situation. To be specific, 16 sectors (for example, sectors 501a through 501p in FIG. 13) make up one ECC block and a strong error correcting function is built in it. As a result, even in the event of any error in the ECC block (such as inability to reproduce the sector 501c), the error can be corrected, allowing all the information in the ECC block to be reproduced correctly.

[Recording Signal Structure Conversion Procedure for Information to be Recorded on Information Recording Medium]

When a read/write DVD-RAM disk is used as an information storage medium, signals are recorded while constituting one ECC block for every 16 sectors.

Figure 14:
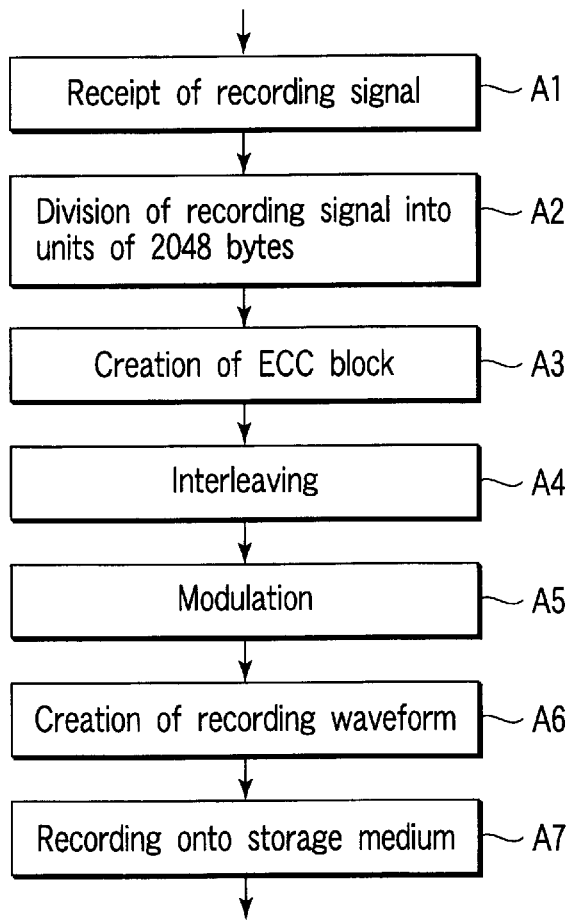
FIG. 14 is a flowchart illustrating the signal recording procedure in DVD.
Figure 15:
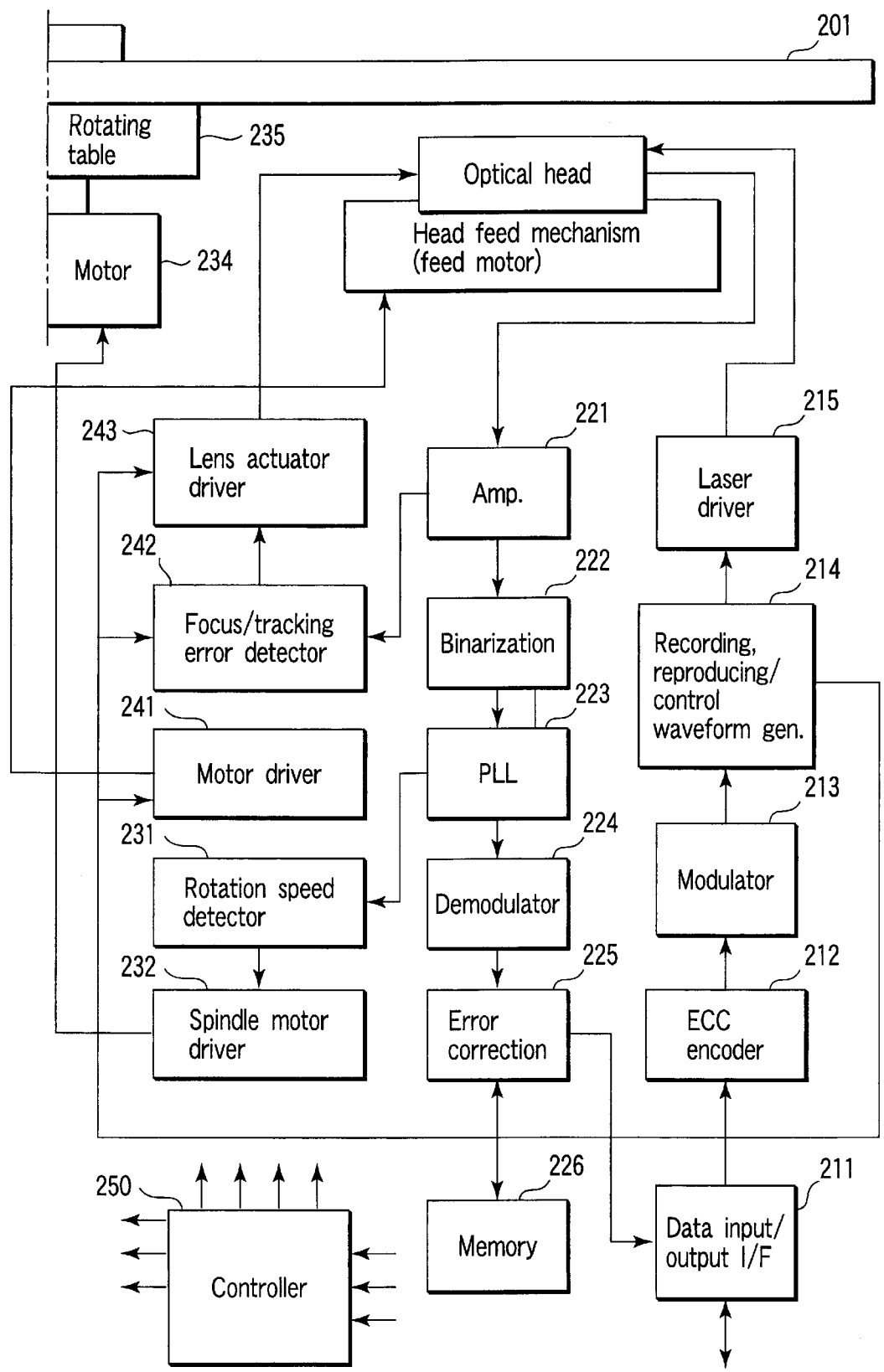
FIG. 15 is a block diagram mainly illustrating the physical system in the recording/reproducing apparatus of the present invention.

FIG. 14 shows the arrangement of an ECC block and FIG. 15 is a block diagram of the entire information recording/reproducing apparatus. In FIG. 15, 201 denotes an information recording medium (optical disk); 202, an optical head; and 203, a head feed mechanism that moves the optical head in the direction of radius of the disk.

A recording signal is input via a data input-output interface 211 to an ECC encoder 212 where it is arranged in ECC blocks and then to a modulator 213 where it is subjected to 8/16 modulation. The resultant signal is input to a recording, reproducing, erasing, control waveform generating unit (signal processing unit) 214 to produce a modulated recording signal, which is in turn applied to a laser driver 215 to control the intensity of a laser beam produced by an optical head 202.

At reproduction time, a reproduced signal read by the optical head 202 is amplified by an amplifier 221 and then input to a binarization circuit 222 where it is converted into a binary signal. The binary signal is then applied via a PLL circuit 223 to a demodulator 224 where it is subjected to 16/8 demodulation. The demodulated signal is input to an error correction circuit 225 where it undergoes error correction on an ECC block basis. At this point, a semiconductor memory 226 is also used.

A clock from the PLL circuit 223 is input to a medium rotation speed detector 231 which outputs rotation speed information, which in turn is applied to a spindle motor controller 232. The controller controls the rotation of a motor 234 to rotate at a desired speed a rotating table 235 on which the optical disk 201 is placed.

A feed motor driver 241 controls the feed motor in a head moving mechanism 203 to control the position of the optical head 202 relative to the disk 201. A focus/tracking error detector 242 detects focus and tracking errors from the pickup signal and then controls an objective lens actuator 243 correspondingly. Thereby, the focus and tracking errors are corrected. A controller 250 controls the entire apparatus and moreover, at record time, produces control information to be recorded on the disk and, at playback time, reads the control information to identify the reproducing position.

A flowchart in the record mode will be described with reference to FIGS. 14 and 15.

At record time, conversion processing is performed on an original signal (scrambling, appending parity codes to ECC blocks, interleaving, and modulation that conforms to characteristics of the recording medium for the purpose of increasing the recording density).

Taking a read/write DVD-RAM disk as an example of an information storage medium, the procedure of converting the structure of a recording signal will be described in accordance with the flowchart.

A) Application of a raw signal to be recorded to the apparatus (step A1). The recording signal d sent from a host computer, such as a personal computer (PC) or engineering work station (EWS), is input via the interface 211 to information recording/reproducing section (physical block).

B) Division of the recording signal into blocks of 2048 bytes (step A2). In the interface 211 the recording signal d is divided into a series of blocks of 2048 bytes. As shown in FIG. 9, data ID is appended to each block and scramble processing is then performed on the main data in each block. The resulting signal is then sent to the ECC encoder 212.

C) Creation of an ECC block (step A3). The ECC encoder 212 subjects the signal in the data division in FIG. 10 to scrambling and collects 16 sets of such signals to produce a block of 172 bytes by 192 columns. Afterwards, inner parity codes (PI) and outer parity codes (PO) are appended as shown in FIG. 10.

F) Interleave processing (step A4). The ECC encoder 212 performs interleave processing on PO as shown in FIG. 11.

G) Signal modulation processing (step A5). The modulator 213 modulates the PO-interleaved signal and then appends sync codes to the modulated signals.

H) Recording waveform creation processing (step A6). The control waveform generator 214 produces recording waveforms corresponding to the signal output from the modulator and sends them to the semiconductor laser driver 215.

With DVD-RAM disks, the "mark length recording" scheme is adopted; hence, each of the rising and falling edges of write pulses coincides with a 1 in modulated signal.

I) Recording on the information recording medium 201 (step A7). The laser beam emitted from the optical head 202 and focused onto the recording surface of the disk is switched on and off, whereby recording marks are formed on the recording surface of the disk.

The above procedure will be described in more detail below.

The construction of a recording signal in units of 2048 bytes prior to scrambling. Main data (D0 to D2047) are produced. The recording signal d sent from a personal computer (PC) or engineering work station (EWS) is input to the interface 211 where it is divided into a series of blocks of 2048 bytes. Each signal of 2048 bytes is incorporated into the main data as shown in FIGS. 9 and 10. Data ID, IED, RSV and EDC, which will be described below, are added before and after the main data (D0 to D2047).

The data ID is described in four bytes and indicates a data area, read-in area, or read-out area. The data further describes a data type (either read only data or rewritable data), the disk layer number, and a value of the logical sector number of the corresponding sector plus "31000h".

The IED is an error detecting code for the data ID. At playback time, the IED signal is operated on the reproduced ID data for error correction thereof. The RSV (reserve) is an area of six bytes which allows for recording of specified information in future specific standards.

The EDC (error detecting code), four bytes long, is an error correcting code for the 2060-byte signal containing the data ID through the main data D2047 shown in FIG. 9.

In reading information from the storage medium (optical disk) 201, the error correction unit 225 subjects the demodulated signal from the demodulator 224 to error correction and descrambling within the ECC block. Thereby, the data structured as shown in FIG. 9 is recovered. The EDC is then used to detect an error in the 2060-byte signal from the data ID through the main data D2047 in the corresponding sector. Here, if an error is detected, the processing may return to the ECC block error correction procedure.

Scrambling of the main data D0 through D2047 at record time will be described.

The EDC is produced from the above main data D0 through D2047. After a recording signal of a sector unit has been produced as shown in FIG. 9, scramble processing is performed only on the main data D0 through D2047.

The scrambling circuit is constructed, through not shown, from an 8-bit parallel-in serial-out shifter register and an exclusive OR circuit. Each main data is input to the bit positions 0–8 of the shift register. The exclusive OR circuit has its inputs connected to the bit positions 10 and 14 of the shift register and its output connected to the bit position 0.

At the start of scrambling, the initial data in the shift register is the last 15 bits in the data ID in the sector. The structure and size of the recording signal after scrambling remain the same as in FIG. 9.

The recording signal structure in the ECC block will be described in more detail. The DVD-ROM, DVD-R and DVD-RAM disks adopt a product code for ECC. A method of forming an ECC block will be described specifically taking the data structure of FIG. 13 by way of example.

First, in the scrambled signal in the first sector in the ECC block, components from the data ID to the main data D159 (the signal in the first row in FIG. 9) are placed in byte locations B(0,0) to B(0, 171) in FIG. 10.

The next 172-byte main data from D160 to D331 (the signal in the second row in FIG. 9) in the first sector 501*a* are placed in byte locations B(1,0) to B(1,171) in FIG. 10. Likewise, the remaining byte components in the sector 501*a* are sequentially placed in corresponding byte locations as shown in FIG. 10. The data in the sector 501*a* occupies 12 rows in FIG. 10. In the same manner, 2048 bytes of data in the scrambled signal in the second sector 501*b* are placed in 12 subsequent rows from the 13-rd row to the 24-th row.

The 168-byte main data (D1880 to D2047) and EDC in the 16-th sector 501*p* in FIG. 13 are placed in byte locations B(191,0) to B(191, 174) in the 192-nd row in FIG. 10.

Ten bytes of PI are generated for the 172-byte signal from B(0,0) to B(0, 171) in FIG. 10 and the results are then inserted in byte locations B(0,172) to B(0,181). The same procedure is repeated until 10 bytes of PI for B(191,0) to B(191,171) in the last row in FIG. 10 are inserted in byte locations B(191,172) to B(191, 181).

Next, 16 bytes of PO are generated for the 192-byte signal in byte locations B(0,0) to B(191,0) arranged vertically as shown in FIG. 10 and the results are inserted in vertically arranged byte locations B(192,0) to B(207,0). The same procedure is repeated until 16 bytes of PO are generated for the 192-byte signal in the last column from B(0,181) to B(191, 181) and the results are inserted in B(192, 181) to B(207,181).

The PO interleaving within the ECC block will be described below.

After the generation of PI and PO in FIG. 10, the recording signal is segmented into 16 groups of 12 rows and each of 16 rows of PO is inserted to follow a corresponding one of the 16 groups.

That is, the first row of PO from B(192,0) to B(192, 181) is inserted to the 13-rd row immediately below the 12-nd row from B(11,0) to B(11,181) as shown in FIG. 11. The same procedure is repeated until the recording signal is rearranged as shown in FIG. 11.

The recording signal that is recorded actually on the information storage medium is composed as follows:

The in-ECC-block recording signal after PO interleaving is segmented into groups of 13 rows and each group is recorded in a corresponding one of the sectors 501*a* to 501*p* in FIG. 13. On the information storage medium 201, a physical sector number has been recorded previously at the start of each sector in the form of projections and recesses and used as a header. As shown in FIG. 16, 13 rows of signal are recorded between the header of one sector and the header of the next sector.

With the recording signal structure of FIG. 11, there is the possibility of arrangement of consecutive 0s in the recording signal. Recording the signal as it is may result in bit shift errors at playback time in locations where a large number of 0s have been arranged consecutively. For this reason, the upper limit is imposed on the number of consecutive 0s and signal conversion (modulation) is performed so as to allow for high-density recording. With DVD-ROM and DVD-RAM disks, a technique called "8/16 modulation" (RLL(2, 10) code in run-length coding) is adopted.

The signal thus modulated is recorded on the storage medium with sync codes intervened as shown in FIG. 16.

Reverse conversion processing on a reproduced signal from the information storage medium will be described.

A signal read from the information storage medium (optical disk) 201 is subjected to reverse conversion in accordance with the following procedure.

Information is recovered from the signal read from the disk in the path of the optical head 202, the amplifier 221, the binarization circuit 222, the PLL circuit 223 and the demodulator 224 shown in FIG. 15.

In the error correction unit 225, error correction is made using PI and PO described in connection with FIG. 10. The error corrected signal is reconverted into the main data (D0 to D2047) by descrambling which is the reverse of scrambling. The signal after being descrambled is the same as the recording signal in FIG. 9.

Next, error detection is made on the main data D0 to D2047 using EDC. If any error is detected at this stage, a return is made to error correction for ECC block.

The reproduced information obtained for each sector is sent through the interface 211 to host computer, such as PC or EWC.

FIG. 17A is a schematic representation of the occurrence of an unwanted jump (either interlayer or intertrack) on the optical disk 201 at write time. In such an event, in the location to which the jump has been made, the ECC block already recorded is overwritten by the current recording signal as shown in FIG. 17B. The overwriting results in destruction of existing data in that location. An arrow J indicates the overwritten location.

Figure 18:
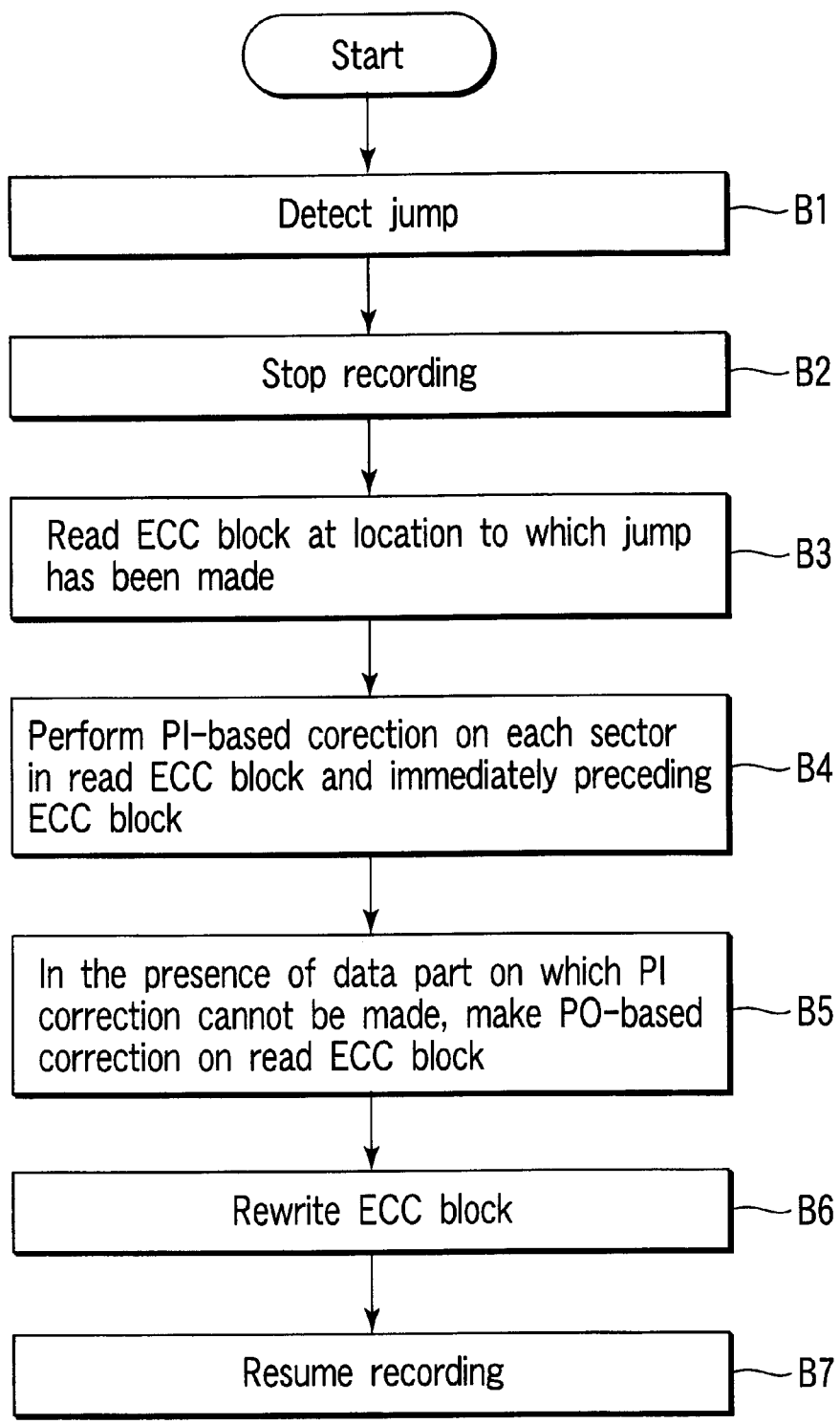
FIG. 18 is a flowchart for detection and recovery of a damaged ECC block.

FIG. 18 is a flowchart for data recovery at the time of a jump. Upon detecting a jump (step B1), recording is stopped temporarily (step B2). Next, the ECC block to which the jump has been made and the immediately preceding ECC block are read (step B3). The PI-based error correction procedure is carried out on each ECC block. In the presence of a row that cannot be corrected, the ECC block that contains that row is considered to have been overwritten (step B4).

The PO-based correction is made on the detected ECC block. The PI correction may be made again. The ECC block subjected to correction is rewritten by adding PI and PO again (step B4). A return is then made to recording (step B7).

The present invention is not limited to the above embodiment. For example, physical addresses of different patterns can be utilized at read time as well. That is, there may be provided means for monitoring physical addresses or information forming physical addresses during reading from the disk and means for, when detecting information forming a physical address represented in a pattern different from the current pattern two or more times in an interval different from a preset interval, deciding that an interlayer or intertrack jump has occurred and changing the read operation.

Changing the read operation is to, when a different pattern is detected, change the read position to the physical address which has been previously read from. In this case, therefore, the present system is provided with means for reserving physical addresses in sequence. When a return is made to the previous read position, reference is made to the reserved physical address.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A recording medium in which each recording track is divided into recording areas each of a predetermined recording capacity and, in each of the recording areas, its physical address is formed of embossed pits, wherein embossed pit patterns are made different between adjacent tracks (or between adjacent layers).

2. The recording medium according to claim 1, wherein signals are recorded on grooves only.

3. A recording medium in which each recording track is divided into recording areas each of a predetermined recording capacity and, in each of the recording areas, information containing its physical address is formed of embossed pits, wherein patterns of embossed pits are made different between adjacent tracks (or between adjacent layers).

4. A recording medium in which a recording track is divided into recording areas each of a predetermined recording capacity and a mark is put in each of the recording areas to form its physical address, wherein the marks on a track L1 are made different in shape from those on the adjacent track (or a different layer).

5. A recording medium in which a recording track is divided into recording areas each of a predetermined recording capacity and a mark is put in each of the recording areas to form information containing its physical address, wherein the marks on a track L1 are made different in shape from those on the adjacent track (or a different layer).

6. The recording medium according to any one of claims 4 and 5, wherein the patterns of embossed pits are made to differ between adjacent tracks and between layers.

7. The recording medium according to any one of claims 4 and 5, wherein the marks are made to differ in shape between adjacent tracks and between layers.

8. The recording medium according to any one of claims 1, 2 and 4, wherein signals are recorded on both grooves and lands.

9. A signal recording method, during recording of information onto a disk, monitoring physical addresses or information forming physical addresses and, upon detecting a physical address or information forming a physical address that is represented in a pattern different from the current pattern in an interval different from a preset interval, stopping the recording immediately with determination that a jump has occurred between tracks or between layers.

10. A signal recording apparatus comprising: means for monitoring physical addresses or information forming physical addresses during recording of information onto a disk; and means for, upon detecting a physical address or information forming a physical address that is represented in a pattern different from the current pattern in an interval different from a preset interval, stopping the recording immediately with determination that a jump has occurred between tracks or between layers.

11. A signal reproducing apparatus comprising:

means for monitoring physical addresses or information forming physical addresses during reproducing of information from a disk; and means for, when detecting a physical address or information forming a physical address that is represented in a pattern different from the current pattern two or more times in an interval different from a preset interval, stopping the reproducing immediately with determination that a jump has occurred between tracks or between layers.

12. A signal recording apparatus comprising:

means for monitoring physical addresses or information forming physical addresses during recording of information onto a disk;

means for, upon detecting a physical address or information forming a physical address that is represented in a pattern different from the current pattern in an interval different from a preset interval, stopping the recording immediately with determination that a jump has occurred between tracks or between layers;

recovery means for making error corrections on the physical address information represented in the different pattern and writing corrected data into that physical address again; and means for returning the operation to recording after the writing by the recovery means.

* * * * *